United States Patent
Styn et al.

(10) Patent No.: US 9,463,727 B2
(45) Date of Patent: Oct. 11, 2016

(54) VEHICLE SEAT COVERING ASSEMBLY

(71) Applicant: Honda Motor CO., LTD., Tokyo (JP)

(72) Inventors: Christopher Styn, Powell, OH (US); Spyridon Blatseas, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/459,991

(22) Filed: Aug. 14, 2014

(65) Prior Publication Data
US 2016/0046220 A1 Feb. 18, 2016

(51) Int. Cl.
| | |
|---|---|
| *B60N 2/58* | (2006.01) |
| *B60N 2/64* | (2006.01) |
| *B60N 2/60* | (2006.01) |
| *B60N 2/20* | (2006.01) |
| *B60N 2/36* | (2006.01) |

(52) U.S. Cl.
CPC ............ *B60N 2/6009* (2013.01); *B60N 2/206* (2013.01); *B60N 2/36* (2013.01); *B60N 2002/363* (2013.01)

(58) Field of Classification Search
CPC .... B60N 2/5816; B60N 2/5825; B60N 2/64; B60N 2/6009; B60N 2/6027; B60N 2002/363; B60N 2/36; B60N 2/206
USPC ................. 297/452.38, 15, 452.59
See application file for complete search history.

(56) References Cited

U.S. PATENT DOCUMENTS

| | | | |
|---|---|---|---|
| 2,313,812 A | 3/1943 | Duffy | |
| 2,687,545 A | 8/1954 | Karas | |
| 2,779,048 A | 1/1957 | Larabell | |
| 3,011,822 A * | 12/1961 | May | B60N 2/20 296/66 |
| 3,703,312 A | 11/1972 | Chapman | |
| 4,054,698 A | 10/1977 | Hamrah | |
| 4,510,634 A * | 4/1985 | Diedrich | A47D 13/02 297/256.15 |
| 4,588,628 A | 5/1986 | Roth | |
| 4,692,364 A | 9/1987 | Altus | |
| 4,751,764 A | 6/1988 | Reuben | |
| 4,758,457 A | 7/1988 | Altus | |

(Continued)

OTHER PUBLICATIONS

Carpet Gripper and Edging, Apr. 15, 2014.

(Continued)

*Primary Examiner* — David R Dunn
*Assistant Examiner* — Tania Abraham
(74) *Attorney, Agent, or Firm* — Kramer Amado P.C.

(57) ABSTRACT

The vehicle seat cover assembly covers a portion of a vehicle seat back. The vehicle seat cover assembly comprises a base member including a first portion and a second portion. The base member includes at least one connecting component to permit interlocking engagement therewith, a covering configured to be connected to the base member to cover a portion of the base member, and, a fastening member including at least one fastening component configure to attach the covering to the base member. The covering is positioned intermediate to the fastening member and the base member such that the fastening component of the fastening member engages the connecting component of the base member thereby attaching the covering to the base member.

17 Claims, 8 Drawing Sheets

(56) References Cited

U.S. PATENT DOCUMENTS

| | | | | |
|---|---|---|---|---|
| 4,789,201 A * | 12/1988 | Selbert | | B60N 2/5825 297/218.1 |
| 4,979,772 A | 12/1990 | Carey et al. | | |
| 5,636,408 A | 6/1997 | Dichtel | | |
| 5,724,703 A | 3/1998 | Wu | | |
| 6,152,534 A * | 11/2000 | Maeda | | B60N 2/5825 297/218.3 |
| 6,315,364 B1 * | 11/2001 | Fujita | | A47C 7/24 297/452.56 |
| 6,318,784 B2 | 11/2001 | Nishide | | |
| 6,347,431 B1 | 2/2002 | Gratowski et al. | | |
| 6,375,269 B1 * | 4/2002 | Maeda | | A47C 7/282 297/218.2 |
| 6,550,866 B1 * | 4/2003 | Su | | A47C 7/742 297/440.11 |
| 6,648,395 B2 * | 11/2003 | Hoshino | | B60N 2/206 296/66 |
| 6,726,268 B2 | 4/2004 | Leimer | | |
| 6,729,668 B2 * | 5/2004 | Maibom | | B60N 2/20 160/226 |
| 6,777,060 B2 | 8/2004 | Sehmer et al. | | |
| 7,066,550 B1 * | 6/2006 | Su | | A47C 31/023 297/440.22 |
| 7,077,478 B2 * | 7/2006 | Nakamura | | B60N 2/68 297/440.15 |
| 7,887,131 B2 * | 2/2011 | Chadwick | | A47C 1/03255 297/284.4 |
| 8,398,164 B2 | 3/2013 | Baker et al. | | |
| 8,505,999 B2 | 8/2013 | Whalen et al. | | |
| 8,550,549 B2 | 10/2013 | Baker et al. | | |
| 8,668,225 B2 | 3/2014 | Yamaki et al. | | |
| 8,690,255 B2 | 4/2014 | Yamaki et al. | | |
| 8,702,145 B2 | 4/2014 | Cao et al. | | |
| 8,708,419 B2 | 4/2014 | Shimamura | | |
| 2004/0262975 A1 * | 12/2004 | Su | | A47C 5/06 297/440.11 |
| 2008/0079307 A1 * | 4/2008 | Su | | A47C 7/282 297/452.56 |
| 2013/0119730 A1 * | 5/2013 | Nakagawa | | B60N 2/58 297/218.1 |
| 2014/0103692 A1 * | 4/2014 | Toyama | | B60N 2/36 297/354.1 |

OTHER PUBLICATIONS

TRD Carpet Floor Mat Emblem Corolla Sport Yaris Supra Mr2 Mark X Interior Part, Apr. 15, 2014.

* cited by examiner

VEHICLE SEAT COVERING ASSEMBLY

TECHNICAL FIELD

The present invention relates to a vehicle seat covering member, and more particularly relates to an easy to manufacture and assemble vehicle seat back cover member for covering a back portion of the vehicle seat.

BACKGROUND

Seat members, and particularly vehicle seat members, generally include a back support member operatively connected to a cushion member. The back support member can be adjusted between an upright position and lowered position by mechanical and electrical components located generally at the lower back portion of the vehicle seat. Without any covering, these components, as well as, the space located below the back support, are exposed to passengers in the vehicle. Exposure of these components is generally aesthetically undesirable and additionally can leave the components susceptible to damage.

To cover the lower portion of the back of a vehicle seat, standard seat arrangements are provided a covering, such as fabric or carpet. To attach the covering to the lower portion of the backside of the vehicle seat, it is presently standard practice to sew the covering to the backside of the vehicle seat to cover the backside.

SUMMARY

In light of the present need for a vehicle seat covering assembly for covering the back portion of a vehicle seat, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In summary, the vehicle seat cover assembly comprises a base member including a first portion and a second portion and at least one connecting component to permit interlocking engagement therewith. The vehicle seat cover assembly further includes a covering configured to be connected to the base member to cover a portion of the base member. The covering includes at least one opening formed therein configured to receive at least one fastening component therethrough. The vehicle seat cover assembly further includes a fastening member including at least one fastening component configured to attach the covering to the base member. The covering is positioned intermediate to the fastening member and the base member, such that the fastening component of the fastening member engages the connecting component of the base member, thereby attaching the covering to the base member.

In an embodiment of the vehicle cover assembly, the connecting component of the base member includes at least one opening configured to receive the respective at least one fastening component of the fastening member. The fastening member is configured to operatively engage the respective outer portions of the covering and the base member to form an attachment between the covering and base member about the respective outer portions. The at least one fastening component of the fastening member includes a tab member configured to be inserted into the respective at least one opening of the base member. The tab member of the fastening component includes a flexible stem and an abutment formed at an end portion of the stem, such that when the flexible stem is inserted into the at least one opening of the base member, the abutment engages an inner portion of the base member providing a snap-fit connection.

In another embodiment of the vehicle cover assembly, the at least one fastening member is integrally formed with the base member. As such, the at least one fastening member is operatively connected to the base member by an at least one flexible living hinge. Accordingly, the at least one fastening member includes a first fastening member operatively connected to one side of the base member, a second fastening member operatively connected to an opposing side of the base member, and a third fastening member operatively connected to a lower side of the base member.

The at least one connecting component of the base member includes an opening defining an extension, the extension is configured for insertion into the at least one opening formed in the covering to facilitate attachment of the covering to the base member. The connecting components of the base member each include openings formed in the base member, defining extensions provided along the outer portion of the base member to receive respective openings formed in the covering.

In another embodiment, of the vehicle seat cover assembly, the at least first fastening member is a unitary member having a first portion configured to cooperatively engage one edge of the covering and base member, and a second portion configured to cooperatively engage an opposing edge of the covering and base member.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function

DETAILED DESCRIPTION

The process of sewing the covering to the seat back can be labor intensive, and accordingly costly to manufacture. Accordingly, there exists a need to provide a vehicle seat cover assembly suitable for covering the back portion of a seat arrangement that is easy to manufacture and assemble. It is desirable that the vehicle seat cover assembly is durable enough to protect the user from accessing the lower back portion of the vehicle seat and components, and furthermore, attractive to complement the vehicle's interior design.

The foregoing advantages of the invention are illustrative of those that can be achieved by the various exemplary embodiments and are not intended to be exhaustive or limiting of the possible advantages which can be realized. Thus, these and other advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

The vehicle seat cover assembly can be connected to the back side of a vehicle seat member to cover a gap and/or components located proximate to a lower back portion of the seat member. As such, the vehicle seat cover assembly can provide an aesthetic appearance to the rear portion of the seat member, as well as protect the mechanical and/or electrical components located at the lower portion of the vehicle seat member, when the vehicle seat member is in an upright position, as well as a folded position.

Figure 1:
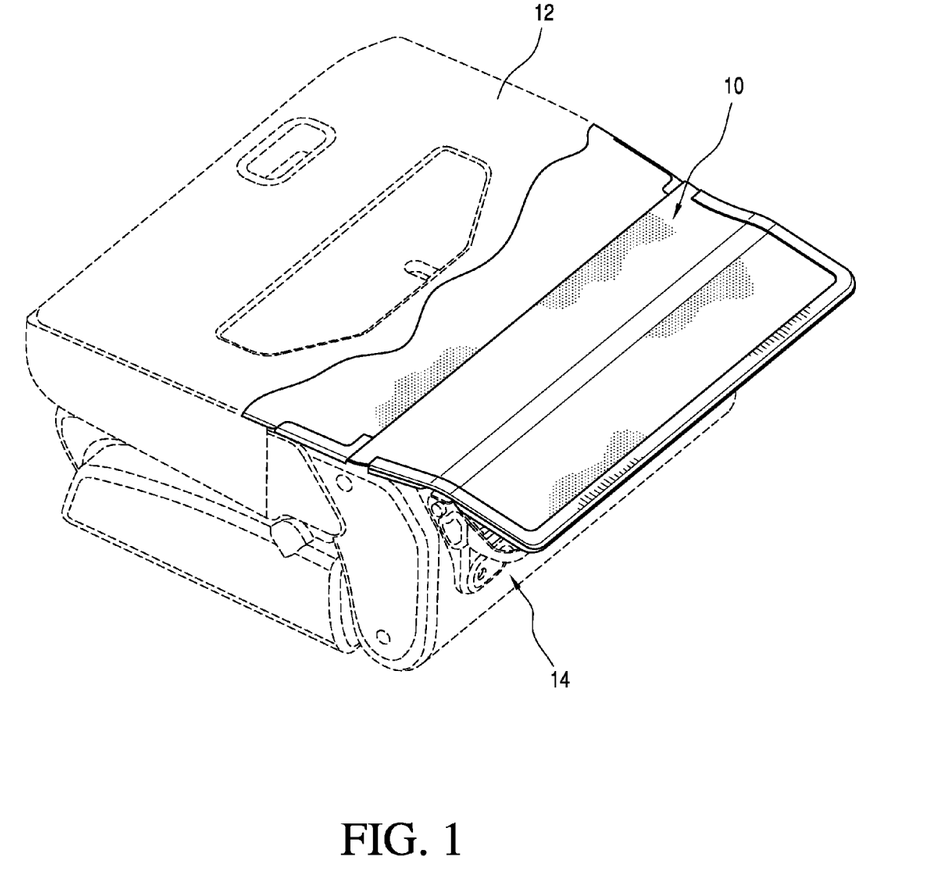
FIG. 1 is an environmental perspective view of a vehicle seat in a lowered position illustrating a vehicle seat cover assembly mounted to the rear lower portion of the vehicle seat in accordance with the present invention.

Referring now to the drawings, wherein the illustrations are for purposes of describing one or more embodiments and not for the purposes of limiting the same, FIG. 1 illustrates an embodiment of the vehicle seat cover assembly generally designated by the reference numeral 10. As shown, the vehicle seat cover assembly 10 can be connected to a generally back portion of a vehicle seat member 12, to cover parts and/or components 14 generally located below the back portion of the seat member 12. Notably, it is contemplated that the vehicle seat cover assembly 10 is not only limited to use in conjunction with seats for vehicles, and accordingly the vehicle seat cover assembly 10 may be used in cooperation with virtually any type of seat member arrangement, including seat members used in airplanes, trains, theaters and other seating venues, for example.

The vehicle seat cover assembly 10 is configured to cover the vehicle seat back 12, when the vehicle seat member 12 is in an upright position, as well as a lowered position. Continuing now to FIGS. 2 and 3, the vehicle seat cover assembly 10 generally includes a base member 22 configured to provide a structural foundation to the vehicle seat cover assembly 10, a covering 24, configured to provide cover to the base member 22, and further connect to the back side of the seat member 12, and a fastening member 26, configured to fasten the covering 24 to the base member 22. The base member 22 and fastening member 26 may be thermoplastic components formable using manufacturing processes such as injection molding, for example.

Figure 2:
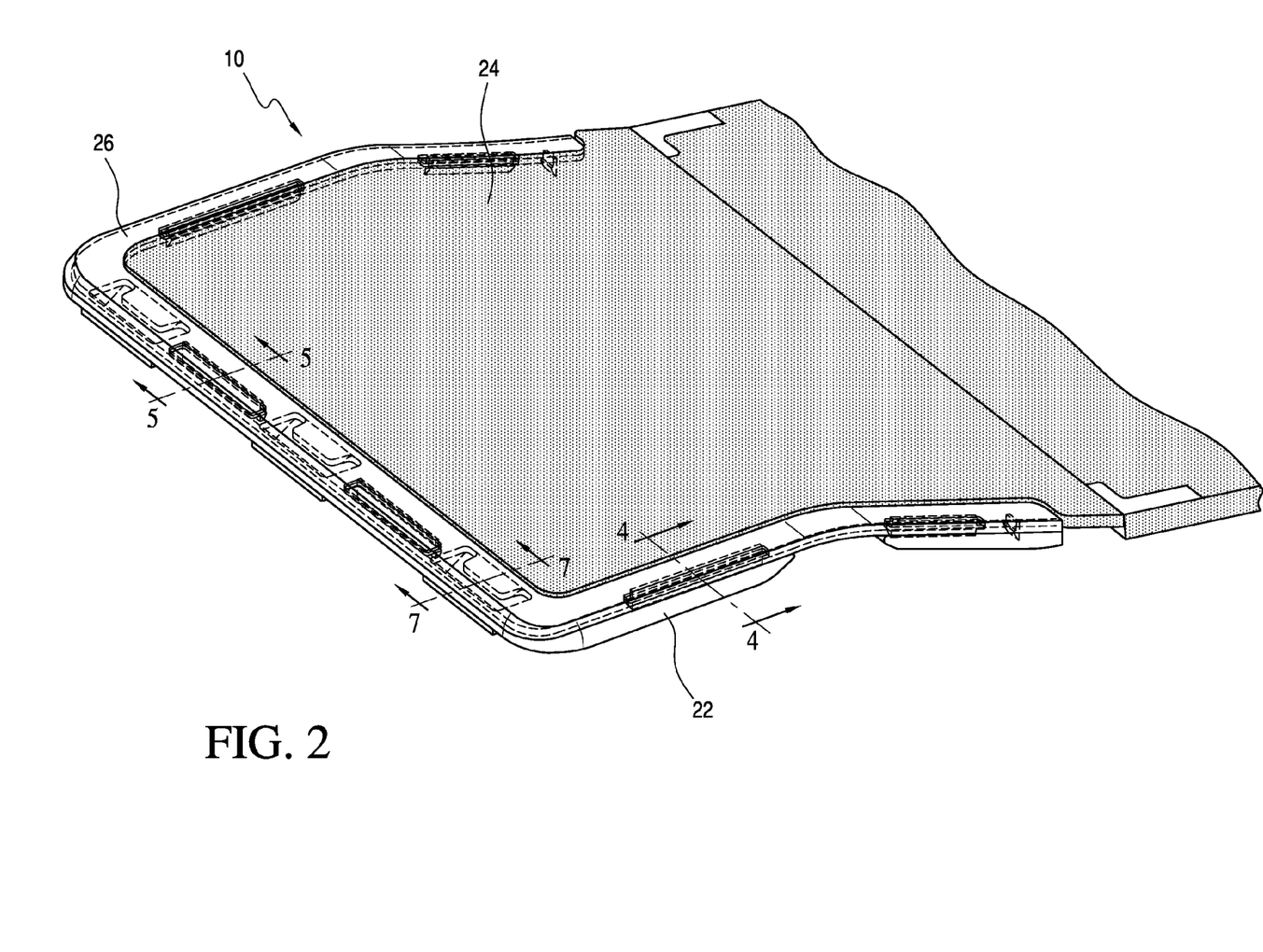
FIG. 2 is a perspective view of the vehicle seat cover assembly of FIG. 1, illustrated in an integral configuration.
Figure 3:
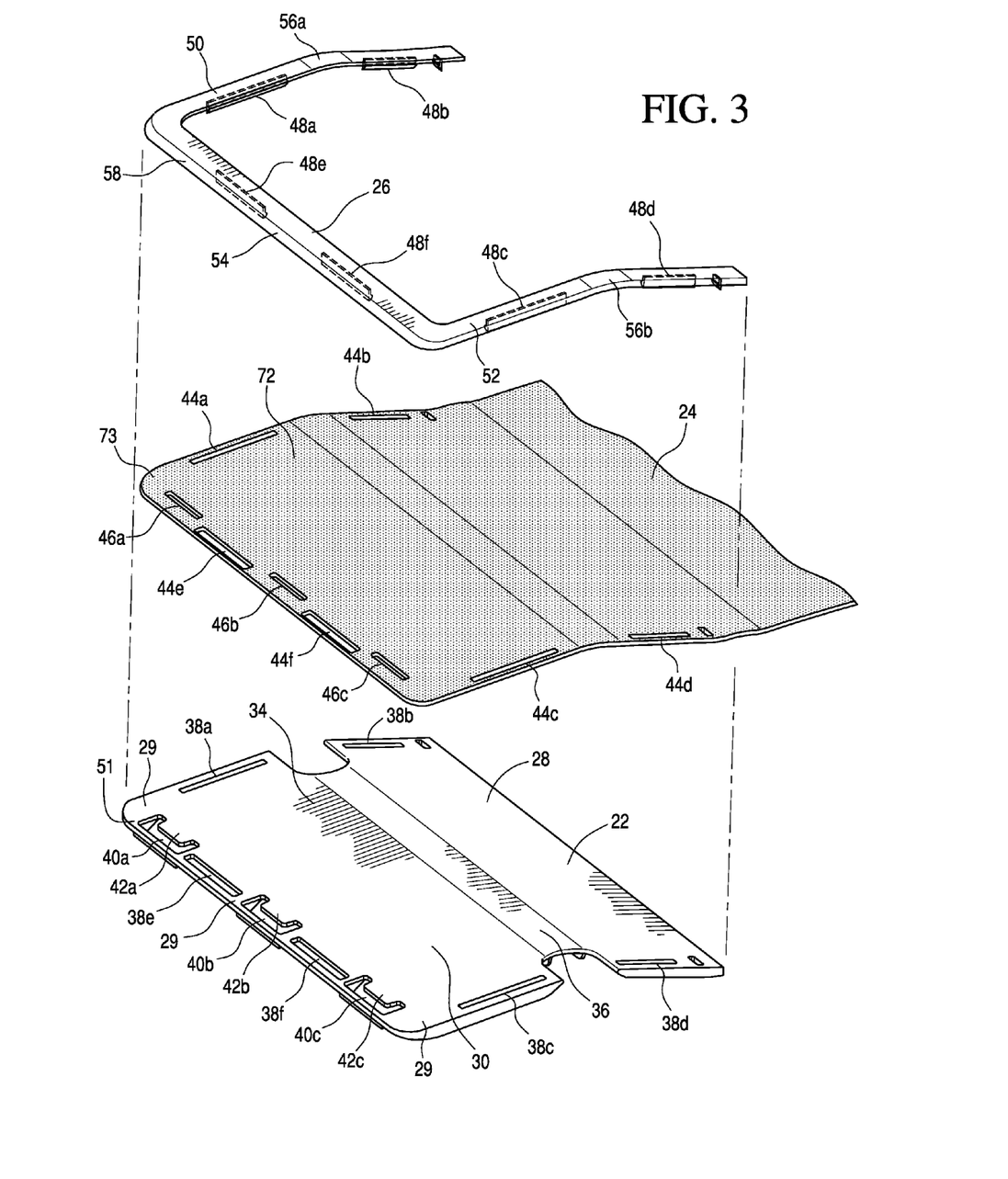
FIG. 3 is an exploded perspective view of the vehicle seat cover assembly of FIG. 2, illustrating connecting features of the vehicle seat cover assembly.

As shown, the base member 22 provides a generally rigid base, anchoring the vehicle seat cover assembly 10 to provide cover to the generally lower back portion 14 of the vehicle seat member 12. The base member 22 generally includes a first portion 28 and a second portion 30, configured to cover the generally lower portion 14 of the vehicle seat back 12. The base member 22 may have a generally planar outer surface 34 to receive the covering 24.

As shown, the first portion 28 and second portion 30 of the base member 22 may be contiguously formed and connected via a joint member 36. The joint member 36 may be flexible, thereby permitting flexible movement of the first portion 28 relative to the second portion 30 when the vehicle seat covering assembly 10 is moved between a lowered position, as shown in FIG. 1, and upright position. Notably, it is further contemplated that the base member 22 may be formed with a flexible material, permitting the base member 22 itself to flex or bend, when the vehicle seat member 12 is moved between an upright position and lowered position.

FIG. 3 illustrates the locking features used to connect the covering 24 to the base member 22, in cooperation with fastening member 26. As shown, the base member 22, covering 24 and fastening member 26 each include one or more locking features configured to operatively engage each other. As shown, the base member 22 generally includes a plurality of connecting components, and/or various slots or openings 38a-f, 40a-c. The connecting components 38a-f and 40a-c may be selectively located about the outer portion 43 or perimeter of the base member 22 as desired, to facilitate connection of the base member 22 with the covering 24 and fastening member 26 at the selected locations. Notably, while FIGS. 2-3 show the connecting components 38a-f and 40a-c, located generally about the outer portion 43, it is contemplated that the locking connecting components 38a-f and 40a-c can be provided at virtually any location to facilitate connection to the covering 24 and fastening member 26.

As shown, the connecting components may include slot openings 38a-f configured to receive respective fastening components 48a-f from the fastening member 26 and a portion of the covering 24 therein. The connecting components 40a-c slot or opening configurations define extensions and/or abutments 42a-c, which are configured for insertion into openings 46a-c formed in the covering 24, which will be further described later and illustrated in FIG. 6.

The covering 24 is configured for attachment to the outer surface 34 of the base member 22, in cooperation with the fastening member 26, to cover to the base member 22 and provide an aesthetically appealing appearance to the vehicle seat cover assembly 10. As shown in FIG. 3, the covering 24 includes one or more openings 44a-f and 46a-c. The openings 44a-f are selectively positioned in alignment with the respective connecting components 38a-f of the base member 22, and receive the fastening components 48a-f of the fastening member 26.

It is contemplated that the covering 24 may be comprised of any type of fabric or material suitable for providing an aesthetic appearance complementing the interior design of the vehicle, such as carpet, leather or synthetic, for example.

The covering 24 may be configured to flex and bend in cooperation with movement of the base member 22. As shown, the covering member 24 generally can be affixed to a generally upper portion of vehicle seat member 12 by processes generally known in the art, such as sewing for example.

The fastening member 26 is adapted to fasten a portion of the covering member 24 to the base member 22. In an embodiment shown in FIG. 3, the fastening member 26 may be separate component removably attachable to the covering 24 and base member 22. As shown, the fastening member 26 may have a generally U-shaped contiguous configuration including a first portion 50, a second portion 52 provided opposite to the first portion 50, and a lower or third portion 54. As such, the fastening member 26 is configured to engage the generally outer perimeter 29 of the base member 22 and outer perimeter 73 of the covering 24. As shown, the fastening member 26 includes one or more fastening components 48a-f adapted for operative engagement with the base member 22.

As shown, the fastening member 26 further includes generally flexible portions 56a and 56b permitting the fastening member 26 to flex or bend in cooperation with the base member 22 and covering 24. Continuing now to FIGS. 4 and 5, there is shown a more detailed illustration of an example of the fastening connections of the base member 22, fastening member 26, and covering 24. As illustrated, the fastening member 26 provides an abutting edge 58 generally located proximate to the inner surface 60 of the fastening member 26 and generally about the outer periphery of the fastening member 26. As such, the edge 58 provides cooperative locking engagement with an inner surface 62 of the base member 22, which will be illustrated in further detail later herein.

Figures 4, 5, 6, 7:
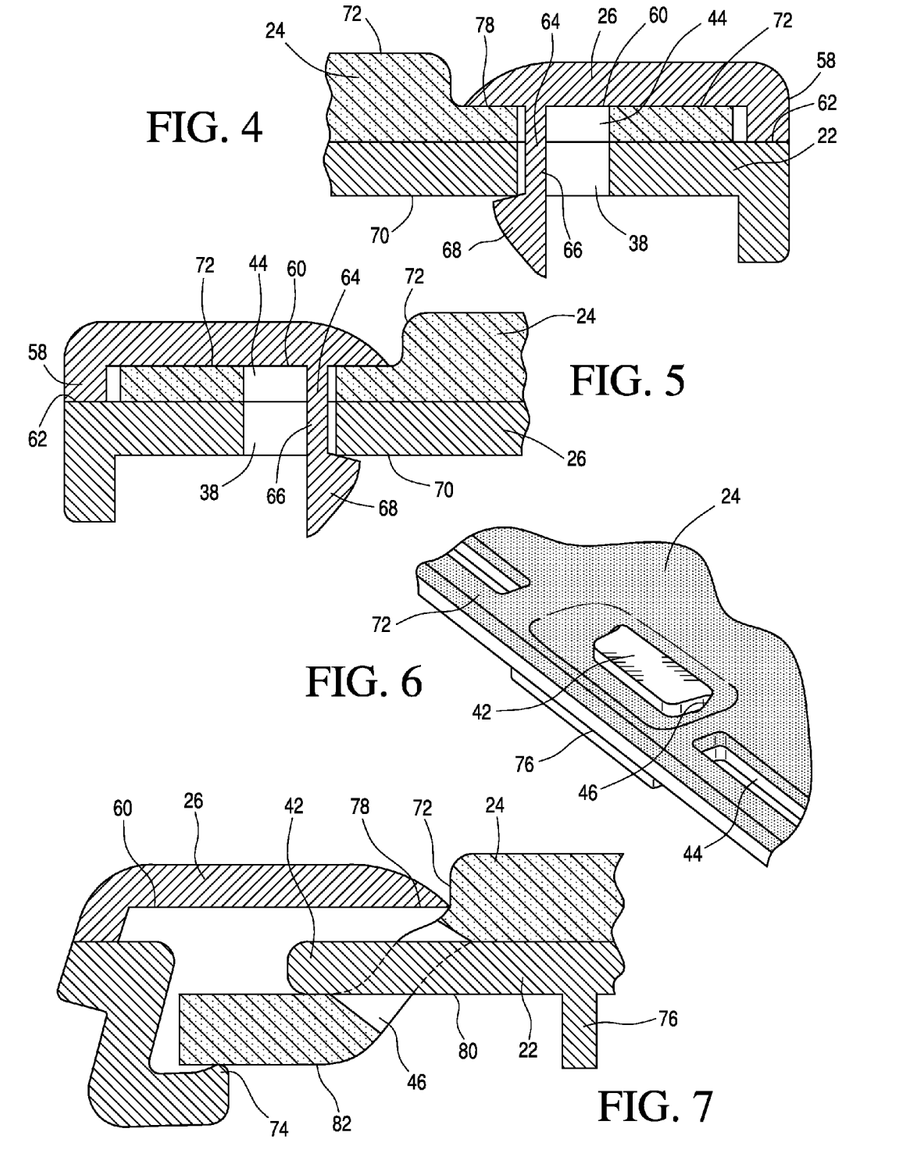
FIG. 4 is a sectional view illustrating an example of the vehicle seat cover assembly fastening features, taken in the direction of the arrows along the section line 4-4 of FIG. 2.
FIG. 5 is a sectional view of an example of the vehicle seat cover assembly fastening features, taken in the direction of the arrows along the section line 5-5 of FIG. 2.
FIG. 6 is a partial perspective view of another example of the vehicle seat cover assembly fastening features of FIG. 2.
FIG. 7 is a sectional view of the vehicle seat cover assembly shown in FIG. 6, taken in the direction of the arrows along the section line 7-7 of FIG. 2.

As shown, the one or more fastening components 48a-f of the fastening member 26 are configured for cooperative fastening engagement with the respective openings 44a-f of the covering 24 and 38a-f of the base member 26. The fastening member 26 provides an inner abutting edge 58 about the inner surface 60 to provide a fastening force to a portion of the outer surface 72 of the covering 24. The fastening components 48a-f further each include a tab member 64 configured for insertion into the respective covering 24 openings 44a-f and base member 22 openings 38a-f.

As shown in detail in FIGS. 4 and 5, the tab member 64 generally includes a flexible projection 66 configured to extend through respective openings 44a-f formed in the respective covering member 24 and openings 38a-f formed in the base member 22. The tab member 64 includes head portion 68 having a relatively rigid body for snapping or locking engagement with the inner surface 70 of the base member 22 providing a snap-fit connection.

FIG. 5 illustrates a similar connection between the fastening member components 48a-f, and openings 44a-f formed on an opposing side of the covering 24. Notably, the aforementioned snap-fit connection arrangement can be provided at various selected locations about the perimeter of the vehicle seat covering 24, base member 22 and fastening member 26, without departing from the scope of the invention.

In addition to the above-mentioned snap-fit connection, the vehicle seat cover assembly may be connected in cooperation with a slot or opening connection as illustrated in FIG. 2 and in more detail in FIG. 6 As shown, slot openings 40a-c are provided along the lower portion base member 22, defining respective extensions or abutments 42a-c. As shown in FIGS. 6 and 7, the respective openings 46a-c of the covering 24 are configured to receive the abutment 42a-c therein such that a portion of the outer surface 72 of the covering 24 engages an inner surface 80 of the respective extension 42a-c. The inner lip 74 of the fastening member 26 operatively engages the inner portion 82 of the covering 24 and the inner edge 78 of the lower portion of the fastening member 26 also cooperatively engages the outer portion 72 of the covering 24. The inner lip 74 of the fastening member 26 provides a connection to inner portion 82 of the covering 24 and inner portion of the base member 22.

Notably it is contemplated that in the alternative, locking features, similar to the fastening components 48a-f shown in the fastening member 26 can also be provided on the base member 22 to facilitate locking engagement with the fastening member 26, without departing from the scope of the invention. Accordingly, it is further contemplated that connecting components 38a-f, such as shown on the base member 22 can be provided on the fastening member 26 to cooperatively receive fastening components located on the base member 22.

Figure 8:
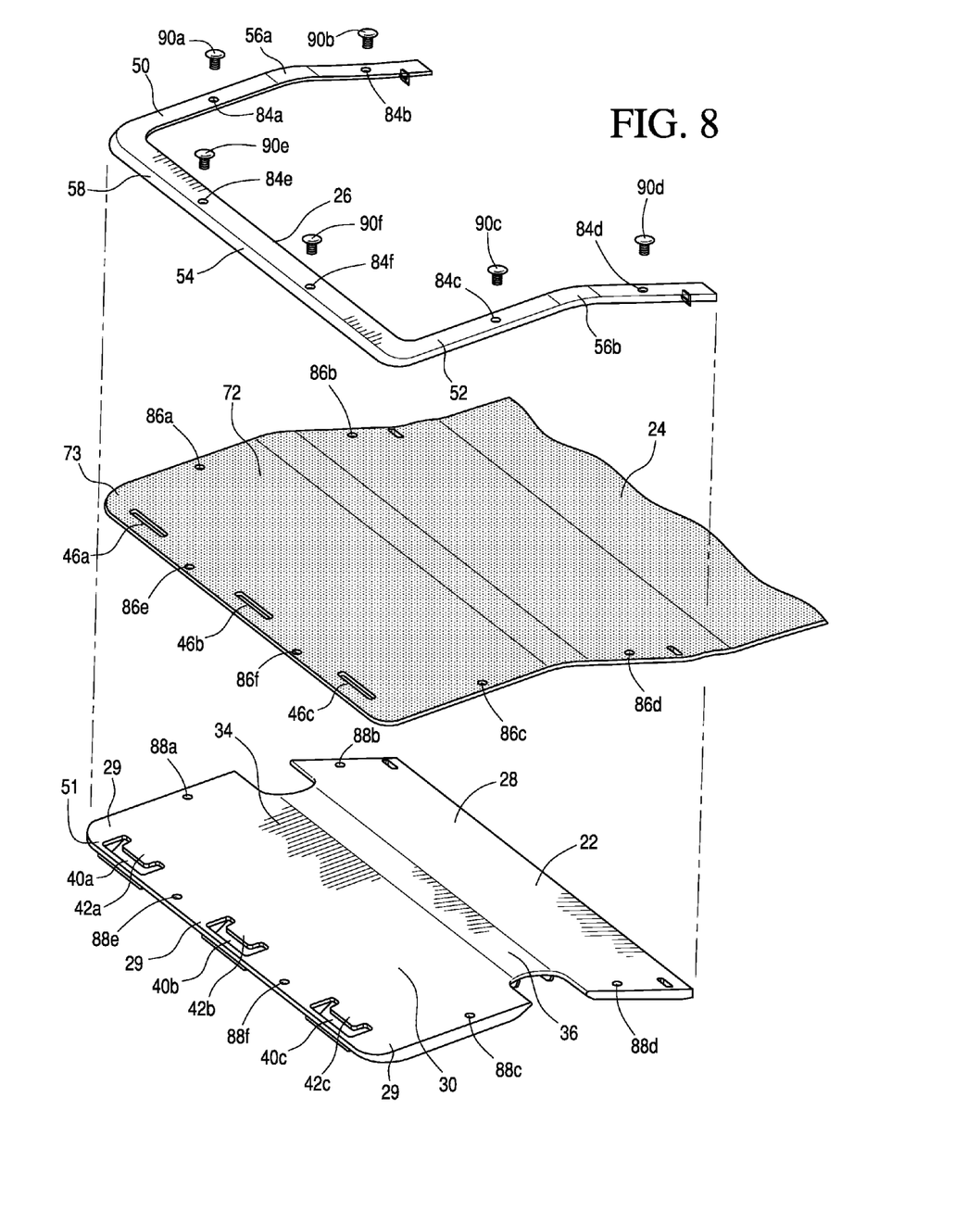
FIG. 8 is an exploded perspective view of an alternative embodiment of the vehicle seat cover assembly illustrating connecting features of the vehicle seat cover assembly.

In an embodiment shown in FIG. 8, it is contemplated that the vehicle seat cover assembly 10 may also include one or more fastening components 90a-f provided as external components, separate from the fastening member 26, such as a screw, thumb-snap fastener, or rivet, for example. In this arrangement, the fasteners 90a-f may operatively engage respective openings 84a-f formed in the fastening member 26, and respective openings 88a-f formed in the base member 22, passing through the respective members 22 and 26, thereby attaching the fastening member 26 to the base member 22. It is further contemplated, that the external fastener may also engage the covering 24 and respective covering openings 86a-f, further attaching covering 24 to the base member 22. The fasteners 90a-f may operate separately, or in conjunction with the fastening components 48a-f provided on the fastening member 26.

Figure 9:
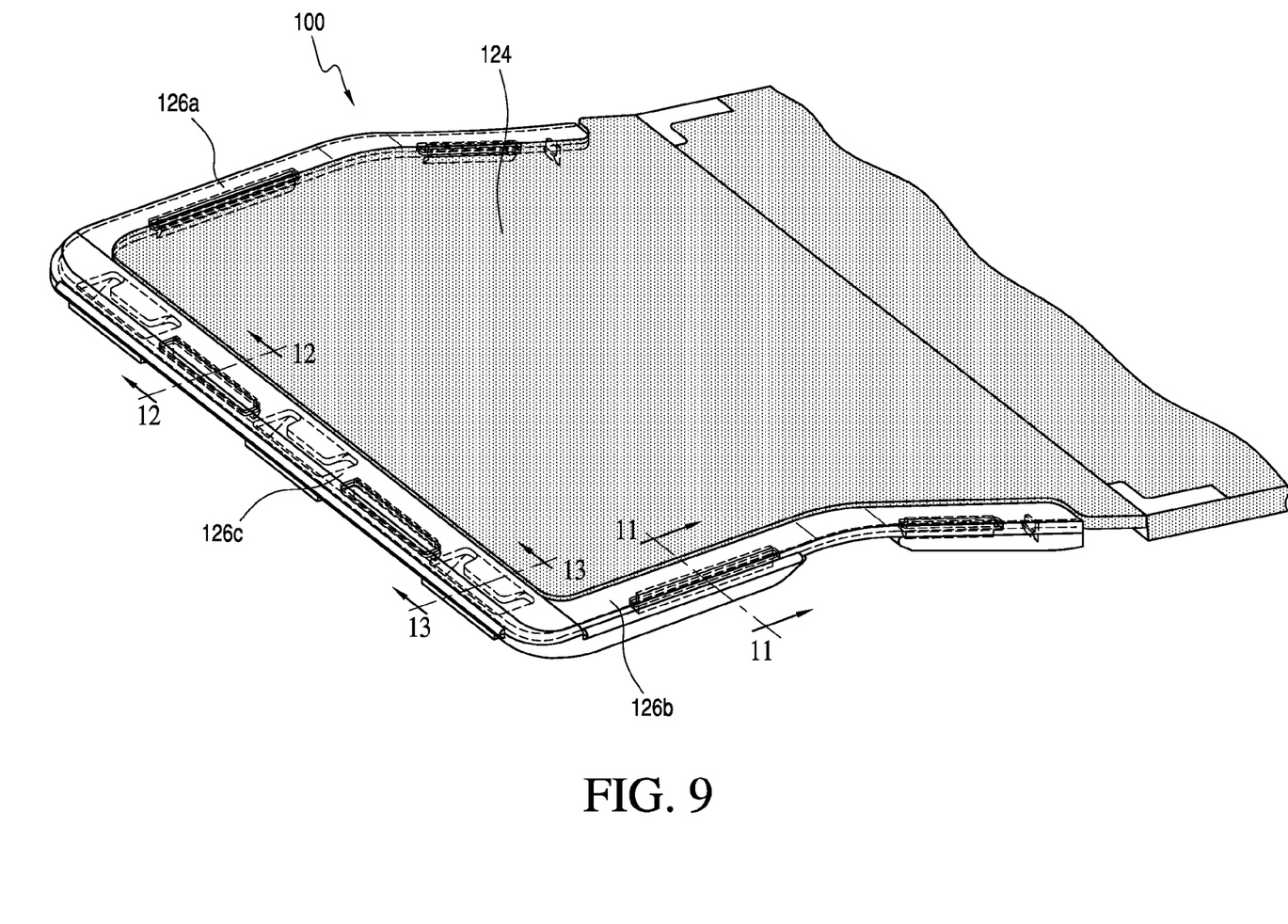
FIG. 9 is a perspective view of an embodiment of the vehicle seat cover assembly illustrating a living hinge connecting feature for attaching a cover member to a base member.
Figure 10:
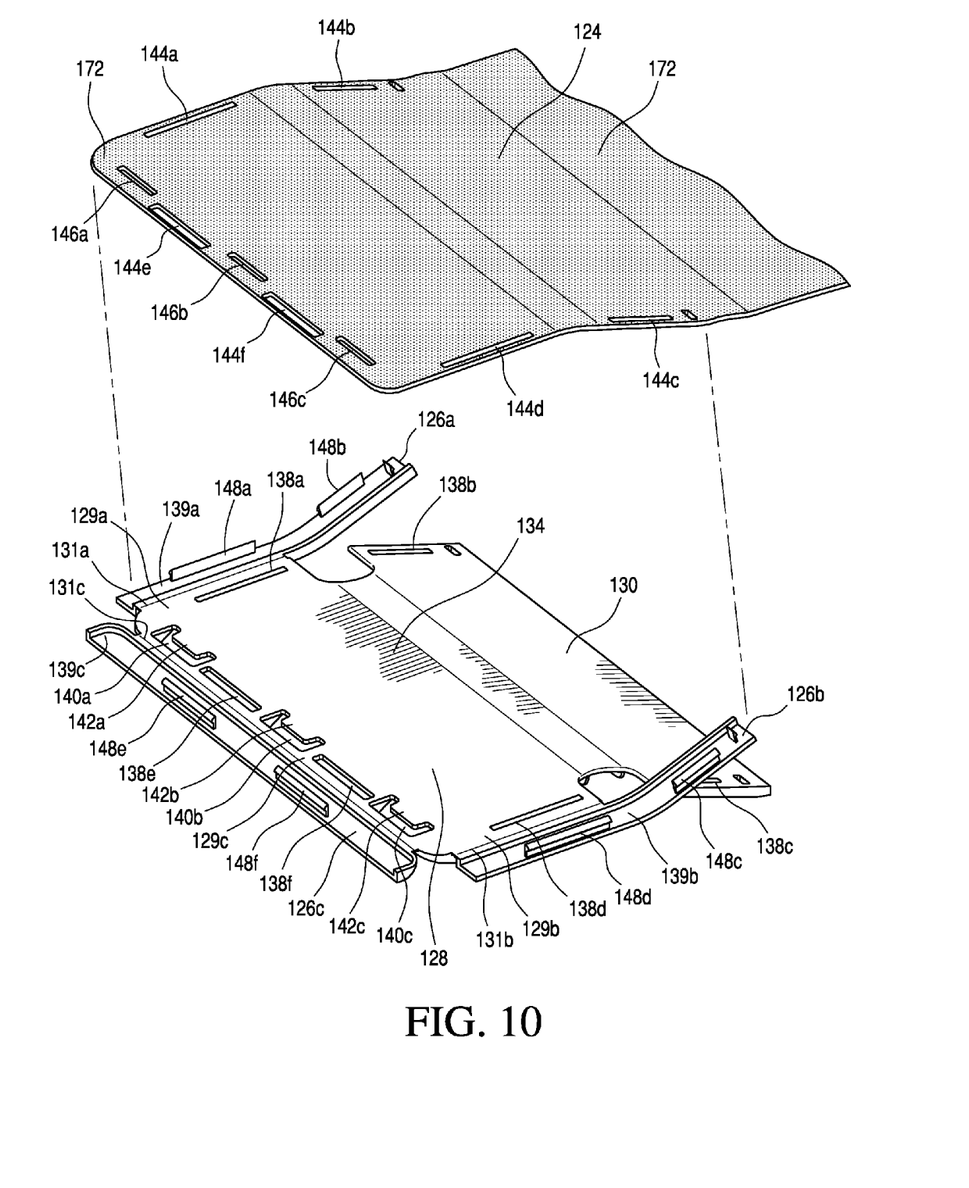
FIG. 10 is an exploded perspective view of the embodiment of the vehicle seat cover assembly of FIG. 9, illustrating the connecting features.

In an embodiment shown in FIGS. 9 and 10, the vehicle seat cover assembly 100 is configured to cover the space 14 and/or gap generally located at the lower back portion of the vehicle seat 12. Similar to the aforementioned embodiment, the vehicle seat cover assembly 100 includes a covering 124, a base member 122 dimensioned to receive the covering 124, and one or more fastening members 126a, 126b and 126c, which may be integrally formed with the base member 122 to fasten the covering 124 to the base member 122. The base member 122 has a first portion 128 and second portion 130.

The base member 122 may include outer portions 129a, 129b provided on opposing ends, and 129c provided along the lower portion of the assembly 100. As shown, respective fastening members 126a, 126b and 126c may be provided about the respective outer portions 129a-c of the base member 122 by one or more respective living hinge members 131a-c. Each respective living hinge member 131a-c may be a generally thin flexible hinge member generally made from the same material as the two rigid pieces it connects, which in this case are the fastening members 126a-c and the base member 122. In general, the hinge member 131a-c may be thinned or cut to allow the respective fastening member 126a-c to bend along the line of the hinge 131a-c.

The respective fastening members 126a, 126b, and 126c, each provide one or more fastening components 148a-f disposed about the inner surfaces 139a-c of the respective fastening members 126a-c and configured for coupling engagement with the respective openings of the base member 138a-f and openings of the covering 144a-f.

FIG. 10 shows an exploded view of the vehicle seat cover assembly 100. As shown the base member 126 generally includes a plurality of connecting components 138a-f and 140a-c, which can be defined as slots or openings configured to cooperatively engage the respective fastening components 148a-f of the fastening members 126a, 126b and 126c and openings 144a-f of the covering. As previously disclosed the components 138a-f and 140a-c may be provided generally about the respective outer portions 129a, 129b and 129c of the base member 122, to facilitate connection with the covering 124 and fastening member 126 at the selected positions. As further illustrated, the respective slot or opening configurations 140a-c may further define an extension and/or abutment 142a-c adapted to be inserted in respective openings formed in the covering 124, which will be further described herein later.

Similar to the covering 24, previously described in FIG. 3, the covering 124 is configured for attachment with to the base member 122, and in cooperation with the fastening members 126a-c. As shown, the covering 124 may provide one or more openings 144a-f and 146a-c, selectively located to cooperatively engage the respective connecting components 138a-f and 142a-c of the base member 122 and respective fastening components 148a-f of the fastening members 126a-c, which will be further described later herein.

Figure 11:
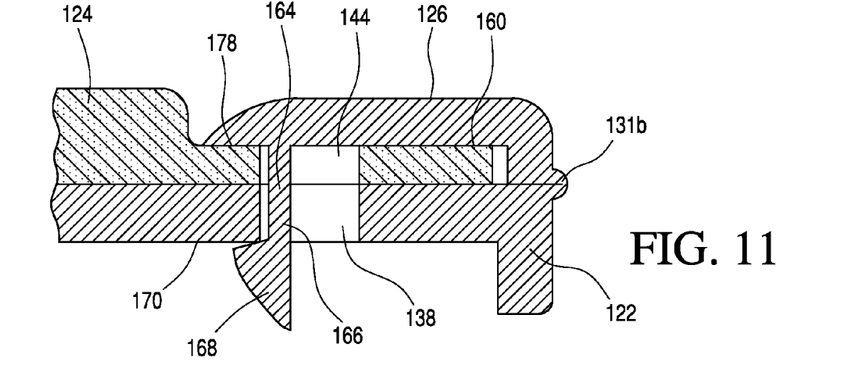
FIG. 11 is a sectional view of the locking features of the vehicle seat cover assembly of FIG. 9, taken in the direction of the arrows along the section line 11-11.
Figure 12:
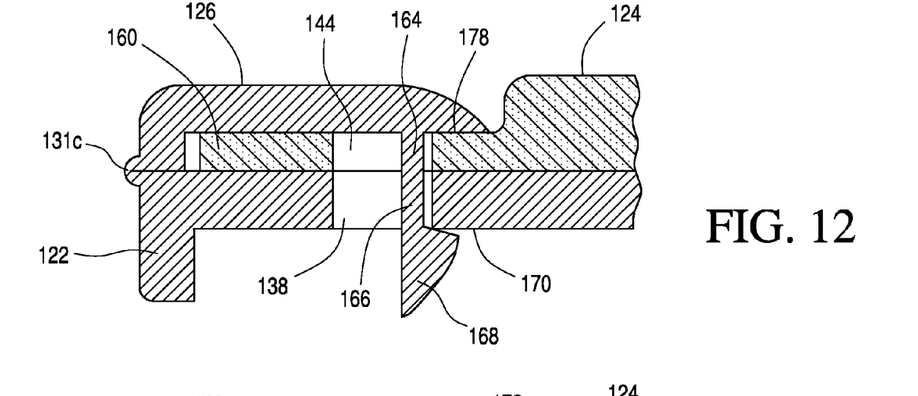
FIG. 12 is a sectional view of the locking features of the vehicle seat cover assembly of FIG. 9, taken in the direction of the arrows along the section line 12-12.
Figure 13:
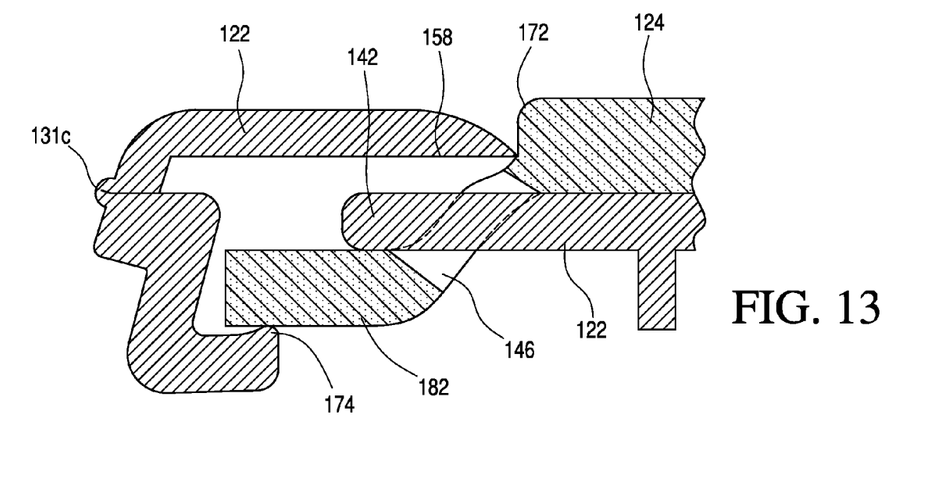
FIG. 13 is a sectional view of the locking features of the vehicle seat cover assembly of FIG. 9, taken in the direction of the arrows along the section line 13-13.

FIGS. 11-13 provide a more detailed illustration of an example of the fastening connections provided by the fastening components of the respective base member 122, fastening member 126 and covering 124. As illustrated, one or more fastening components 148a-c of the fastening member 126 are configured for cooperative fastening engagement with the covering 124 and base member 126. The fastening components 142a-c further include a tab member 164 configured for insertion into the respective covering 124 and base member 122 openings 40a-c and 40c.

As shown in detail in FIGS. 11-12, the tab member 164 generally includes a flexible projection 166 configured to extend through respective openings 138a-f the base member 122 and openings 144a-f of the covering 124. The tab member 164 has head portion 168 having a relatively rigid body for snapping or locking engagement with the inner surface 170 of the base member 122 providing a snap-fit connection.

FIG. 12 illustrates a similar connection between the fastening member 126 components in an opposing direction. As illustrated, the aforementioned snap-fit connection can be provided at various locations about the perimeter of the vehicle seat covering 124 to provide connection of the covering 124 to the base member 122 at various locations, without departing from the scope of the invention.

In addition to the above-mentioned snap-fit connection, the vehicle seat cover assembly 100 may be connected in cooperation with a slot or opening connection as illustrated in FIG. 9 and in more detail in FIG. 13. As shown, slot openings 140a-c are provided along the lower portion base member 122, defining respective abutments 142a-c. As shown, the respective openings 146a-c of the covering 124 are configured to receive the abutment 142a-c therein such that a portion of the outer surface 172 of the covering 124 engages an inner surface 170 of the respective abutment 142a-c. The inner lip 174 of the fastening member 122 operatively engages the inner portion 182 of the covering 124 and the inner edge 178 of the lower portion of the fastening member 126 also cooperatively engages the outer portion 172 of the covering 124. The inner lip 174 of the fastening member 126 provides a connection to the covering 124 and inner portion of the base member 122.

In operation, the respective fastening member 126a-c bends along the living hinge 131a-c from a first open position to a closed position. As such, the abutment edge 158 and tab member 164 cooperatively engages the covering 124 and base member 122 on opposing sides, thus securing the covering 124 to the base 122. As illustrated, the aforementioned connection can be provided at various locations the vehicle seat covering assembly to selectively provide connection of the covering to the base member at various locations.

The method of covering a back portion of a vehicle seat 12 via a vehicle seat cover assembly 10 generally comprises providing a base member 22 having at least one connecting component. Then providing a fastening member 26 having at least one fastening component 48 formed therein and configured to operatively engage a respective connecting component of a base member 22. Thereafter the method steps include providing a covering member 24 having at least one opening 44 formed therein, the opening 44 being configured to receive a fastening component 48 of the fastening member 26.

The method of covering a back portion further comprises placing a portion of the covering 24 on or about a generally outer surface 34 of the base member 22, such that the at least one connecting component 38 of the base member 22 is aligned with the opening 44 formed in the covering 24. Thereafter, the fastening member 26 is placed in engagement with the covering 24 such that the fastening component 48 is aligned with the opening 44 of the covering 24 and is aligned with the connecting component 38 of the base member 22. Further the opening 40 and extension 42 of the base member 22 is aligned with the respective openings 46 formed in the covering 24. Accordingly, the fastening component 48 is inserted into the respective opening 44 and connection component 38. Further, the extension 42 is inserted into the opening 46 formed in the covering 24. As such, a snap-fit engagement is formed between the fastening member 26 and the base member 22 with a portion of the covering 24 attached therebetween.

As shown in the embodiment of FIGS. 9-13, the fastening member 126 may be integrally formed with the base member 122 and connected by a living hinge 131 or a separate member configured to be removably connected to the base member 122.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A vehicle seat cover assembly configured to attach to a back portion of a vehicle seat, comprising:
   a base member provided on the back portion of the vehicle seat to form a back surface of the vehicle seat, the base member including a first portion and a second portion, the base member including at least one connecting component to permit interlocking engagement therewith;

a covering configured to be connected to the base member to cover a portion of the base member, the covering including at least one first opening formed therein configured to receive at least one fastening component therethrough; and
a fastening member including the at least one fastening component configured to attach the covering to the base member, wherein the covering is positioned intermediate to the fastening member and the base member such that the at least one fastening component of the fastening member engages the at least one connecting component of the base member, thereby attaching the covering to the base member, and the at least one connecting component of the base member includes a opening defining an extension, the extension configured to be inserted into at least one second opening formed in the covering to facilitate attachment of the covering to the base member.

2. The vehicle seat cover assembly of claim 1, wherein the at least one connecting component of the base member includes at least one opening configured to receive the respective at least one fastening component of the fastening member.

3. The vehicle seat cover assembly of claim 2, wherein the fastening member is configured to operatively engage respective outer portions of the covering and the base member to form an attachment between the covering and the base member about the respective outer portions.

4. The vehicle seat cover assembly of claim 3, wherein the at least one fastening component of the fastening member includes a tab member configured to be inserted into the respective at least one opening of the base member.

5. The vehicle seat cover assembly of claim 4, wherein the tab member of the fastening component includes a flexible stem and an abutment formed at an end portion of the flexible stem, such that when the flexible stem is inserted into the at least one opening of the base member, the abutment engages an inner portion of the base member providing a snap-fit connection.

6. The vehicle seat cover assembly of claim 3, wherein the fastening member includes an abutment edge configured to engage an inner edge of the base member when in operative engagement.

7. The vehicle seat cover assembly of claim 1, wherein the at least one fastening member is a unitary member having a first portion configured to cooperatively engage one edge of the covering and the base member, a second portion configured to cooperatively engage an opposing edge of the covering, and a third portion configured to cooperatively engage a lower portion of the covering.

8. The vehicle seat cover assembly of claim 1, wherein a first portion of the fastening member includes at least one fastening component disposed on an inner surface of the first portion, a second portion of the fastening member includes at least one fastening component disposed on an inner surface of the second portion, and a third portion of the fastening member includes at least one fastening component disposed on an inner surface of the third portion.

9. The vehicle seat cover assembly of claim 1, wherein the base member includes at least one aperture formed therein defining an extension configured to engage an opening formed in the covering, and the base member further includes at least one opening configured to receive the at least one fastening component from the fastening member.

10. A vehicle seat cover assembly configured to attach to a back portion of a vehicle seat comprising:

a base member provided on the back portion of the vehicle seat to form a back surface of a vehicle seat member, the base member including a first portion and a second portion, the base member including at least one fastening component to permit interlocking engagement therewith;
a covering configured to be connected to the base member to cover a portion of the base member, the covering including at least one opening formed therein configured to receive the at least one fastening component therethrough; and
a fastening member integrally formed with the base member and connected by a living hinge, including at least one connecting component configured to attach the covering to the base member, wherein the covering is positioned intermediate to the fastening member and the base member such that the at least one fastening component of the base member engages the at least one connecting component of the fastening member, thereby attaching the covering to the base member.

11. A method of covering a back portion of a vehicle seat, comprising:
providing a base member configured to be attached to the back portion of the vehicle seat to form a back surface of the vehicle seat, the base member having at least one connecting component;
providing a fastening member having at least one fastening component formed therein configured to operatively engage a respective connecting component of the base member;
providing a covering having at least one first opening formed therein, the at least one first opening being configured to receive the at least one fastening component of the fastening member;
placing a portion of the covering on an outer surface of the base member such that the at least one connecting component of the base member is aligned with the at least one opening formed in the covering;
placing the fastening member in engagement with the covering such that the at least one fastening component is inserted into the at least one opening of the covering and engages the at least one connecting component of the base member a snap fit engagement is formed between the fastening member and the base member with the covering attached therebetween, and the at least one connecting component of the base member includes a opening defining an extension, the extension configured to be inserted into at least one second opening formed in the covering to facilitate attachment of the covering to the base member.

12. The method of claim 11, wherein the fastening member is a separate unitary member configured to be removably connected to the base member.

13. A vehicle seat cover assembly, comprising:
a base member including a first portion and a second portion, the base member including at least one connecting component to permit interlocking engagement therewith;
a covering configured to be connected to the base member to cover a portion of the base member, the covering including at least one opening formed therein configured to receive at least one fastening component therethrough and the covering including at least one opening formed therein configured to receive an extension therethrough; and
a fastening member including at least one fastening component configured to attach the covering to the base member, wherein the at least one connecting component of the base member includes an opening defining an extension, the extension configured to be inserted into the at least one opening formed in the covering to facilitate attachment of the covering to the base member, wherein the covering is positioned intermediate to the fastening member and the base member such that the at least one fastening component of the fastening member engages the at least one connecting component of the base member, thereby attaching the covering to the base member.

14. The vehicle seat cover assembly of claim 13, wherein the at least one fastening member is operatively connected to the base member by an at least one flexible living hinge.

15. The vehicle seat cover assembly of claim 14, wherein the at least one fastening member includes a first fastening member operatively connected to one side of the base member, a second fastening member operatively connected to an opposing side of the base member, and a third fastening member operatively connected to a lower side of the base member.

16. The vehicle seat cover assembly of claim 14, wherein the at least one connecting component of the base member includes an opening defining an extension, the extension being configured to be inserted into the at least one opening formed in the covering to facilitate attachment of the covering to the base member.

17. A method of covering a back portion of a vehicle seat, comprising:

providing a base member having at least one connecting component;

providing a fastening member integrally formed with the base member and connected by a living hinge, the fastening member having at least one fastening component formed therein configured to operatively engage a respective connecting component of a base member;

providing a covering having at least one opening formed therein, the opening being configured to receive a fastening component of a fastening member;

placing a portion of the covering on an outer surface of the base member such that the at least one connecting component of the base member is aligned with the opening formed in the cover;

placing the fastening member in engagement with the covering such that the fastening component is inserted into the opening of the covering and engages the connecting component of base member and a snap fit engagement is formed between the fastening member and the base member with the covering attached therebetween.

* * * * *